US011818189B2

(12) United States Patent
Sodagar

(10) Patent No.: US 11,818,189 B2
(45) Date of Patent: Nov. 14, 2023

(54) METHOD AND APPARATUS FOR MEDIA STREAMING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/447,920

(22) Filed: Sep. 16, 2021

(65) Prior Publication Data

US 2022/0217194 A1  Jul. 7, 2022

Related U.S. Application Data

(60) Provisional application No. 63/134,525, filed on Jan. 6, 2021.

(51) Int. Cl.
*H04N 21/845* (2011.01)
*H04N 21/2187* (2011.01)
(Continued)

(52) U.S. Cl.
CPC .............. *H04L 65/65* (2022.05); *H04L 65/75* (2022.05); *H04N 21/2187* (2013.01); *H04N 21/8456* (2013.01)

(58) Field of Classification Search
CPC ......... H04L 65/65; H04L 65/75; H04L 49/90; H04L 43/106; H04L 43/0852;
(Continued)

(56) References Cited

U.S. PATENT DOCUMENTS 10,341,035 B2 * 7/2019 Delmas .............. H04N 21/4402
10,638,180 B1 * 4/2020 Pringle ................ H04N 21/458
(Continued)

FOREIGN PATENT DOCUMENTS

CN        102215116 B   *  3/2016  ......... H04N 21/2747

OTHER PUBLICATIONS

H. T. Le, Nam Pham Ngoc, A. T. Pham and T. C. Thang, "Adaptive video streaming with smooth advertisement insertion," 2014 IEEE Fifth International Conference on Communications and Electronics (ICCE), 2014, pp. 162-167, doi: 10.1109/CCE.2014.6916697. (Year: 2014).*

(Continued)

*Primary Examiner* — Dhairya A Patel
*Assistant Examiner* — Alex H. Tran
(74) *Attorney, Agent, or Firm* — ARENTFOX SCHIFF LLP

(57) ABSTRACT

Aspects of the disclosure provide methods and apparatuses for playing media using a DASH player. In some examples, an apparatus for playing media includes processing circuitry. The processing circuitry configures a media source extension (MSE) source buffer based on a first media content and a second media content that are of independent timelines. Then, the processing circuitry plays based on segments of the first media content that are appended in the MSE source buffer, and then transitions after a last segment of the first media content, to a first segment of the second media content that are appended in the MSE source buffer.

20 Claims, 5 Drawing Sheets

(51) Int. Cl.
   *H04L 65/65* (2022.01)
   *H04L 65/75* (2022.01)
(58) Field of Classification Search
   CPC ............ H04L 43/0858; H04N 21/2187; H04N 21/8456; H04N 21/44004; H04N 21/26258; H04J 3/0664; H04J 3/065
   See application file for complete search history.

(56) References Cited

U.S. PATENT DOCUMENTS

| | | | | |
|---|---|---|---|---|
| 10,939,149 | B2* | 3/2021 | Oh | H04N 21/2381 |
| 10,985,971 | B2* | 4/2021 | Medina | H04L 49/90 |
| 2014/0189147 | A1* | 7/2014 | Keum | H04L 65/612 709/231 |
| 2018/0213294 | A1* | 7/2018 | Lau | H04N 21/858 |
| 2019/0238950 | A1 | 8/2019 | Stockhammer et al. | |
| 2020/0112761 | A1* | 4/2020 | Stockhammer | H04N 21/435 |
| 2021/0377330 | A1* | 12/2021 | Trayanov | H04N 21/8456 |

OTHER PUBLICATIONS

I. Sodagar, "The MPEG-DASH Standard for Multimedia Streaming Over the Internet," in IEEE MultiMedia, vol. 18, No. 4, pp. 62-67, Apr. 2011, doi: 10.1109/MMUL.2011.71. (Year: 2011).*

T. Lohmar, T. Einarsson, P. Fröjdh, F. Gabin and M. Kampmann, "Dynamic adaptive HTTP streaming of live content," 2011 IEEE International Symposium on a World of Wireless, Mobile and Multimedia Networks, 2011, pp. 1-8, doi: 10.1109/WoWMoM.2011.5986186. (Year: 2011).*

International Search Report and Written Opinion issued in application PCT/US2021/052061 dated Dec. 23, 2021, (13 pages).

Stockhammer—International Organisation for Standardisation Organisation Internationale De Normalisation ISO/IEC JTC1/SC29/WG11 Coding of Moving Pictures and Audio ISO/IEC JTC1/8028/WG11 PEG2019/m52458. Jan. 2020. Brussels, BE (286 pages) Qualcomm Incorporated, Discussion and Agreement, Editor's Version of Dash is 4$^{th}$ Edition.

"Media Source Extensions", R3C Recommendation, Nov. 17, 2016 (77 pages).

Extended European Search Report in EP21918023.9, dated Jun. 21, 2023, 6 pages.

Sodagar, I., "Editorial correction and improvements on Preroll," Internatinoal Organisation for Standardisation ISO/IEC JTC 1/SC 29/WG 3 Coding of Moving Pictures and Audio, Jul. 2021, m57294, Online, 42 pages.

Sodagar, I., "Technologies under Consideration for Dynamic Adaptive Streaming over HTTP 23009, Parts 1, 3, 4, 5 and 6," International Organisation for Standardisation ISO/IEC JTC1/SC29/WG11 Coding of Moving Pictures and Audio, Jan. 2020, MPEG2019/N19008, Brussels, BE, 93 pages.

* cited by examiner

METHOD AND APPARATUS FOR MEDIA STREAMING

INCORPORATION BY REFERENCE

This present disclosure claims the benefit of priority to U.S. Provisional Application No. 63/134,525, "PREROLL TO LIVE COMMON MEDIA APPLICATION FORMAT/DYNAMIC ADAPTIVE STREAMING OVER HTTP PLAYER USING W3C MEDIA EXTENSIONS" filed on Jan. 6, 2021, which is incorporated by reference herein in its entirety.

TECHNICAL FIELD

The present disclosure describes embodiments generally related to methods and apparatuses for playing streaming media.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Moving picture expert group (MPEG) dynamic adaptive streaming over hypertext transfer protocol (DASH) provides a standard for streaming multimedia content over IP networks. A media player may play media content from different sources, such as a preroll content (e.g., advertisement) and a live content (e.g., football game), and the like.

SUMMARY

Aspects of the disclosure provide methods and apparatuses for playing media. In some examples, an apparatus for playing media via a dynamic adaptive streaming over hypertext transfer protocol (DASH) player includes processing circuitry. The processing circuitry configures a media source extension (MSE) source buffer based on a first media content and a second media content that are of independent timelines. Then, the processing circuitry plays based on segments of the first media content that are appended in the MSE source buffer, and then transitions after a last segment of the first media content, to a first segment of the second media content that are appended in the MSE source buffer.

In some embodiments, the processing circuitry configures an append window in the MSE source buffer based on the first media content and the second media content. In some examples, the first media content is a preroll content, and the second media content is a live content, and the processing circuitry determines an end point of the append window based on a sum of a maximum time shift buffer depth and a longest duration of the live content.

In an example, the processing circuitry determines the maximum time shift buffer depth based on a larger one of a maximum possible duration of the preroll content and a desired time shift buffer depth for the live content. Further, the processing circuitry removes a time range of the preroll content after the preroll content is played, and updates a start of the append window based on the maximum time shift buffer depth and the desired time shift buffer depth for the live content.

In another example, the processing circuitry determines the maximum time shift buffer depth based on a sum of at least the maximum possible duration of the preroll content, and the desired time shift buffer depth for the live content. Further, the processing circuitry can configure a time range in the MSE source buffer for a portion of the live content before the preroll content.

In some examples, the first media content is a preroll content, and the second media content is a live content, and the processing circuitry determines a first timestamp offset for segments of the preroll content based on a maximum time shift buffer depth, a maximum possible duration of the preroll content and a presentation time offset of the preroll content. Further, the processing circuitry determines a second timestamp offset for segments of the live content based on the maximum time shift buffer depth and an earliest presentation time of a first segment of the live content.

In an example, the processing circuitry determines the second timestamp offset for segments of the live content based on the maximum time shift buffer depth and a lower bound of the earliest presentation time of the first segment of the live content in response to a same initialization segment for the live content and the preroll content. In another example, the processing circuitry determines the second timestamp offset for segments of the live content based on the maximum time shift buffer depth and the earliest presentation time of the first segment of the live content in response to a sequence mode. In another example, the processing circuitry determining the second timestamp offset for segments of the live content based on the maximum time shift buffer depth and the earliest presentation time of the first segment of the live content in response to a requirement of re-initialization for the live content.

Aspects of the disclosure also provide a non-transitory computer-readable medium storing instructions which when executed by a computer cause the computer to perform the method for playing media.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
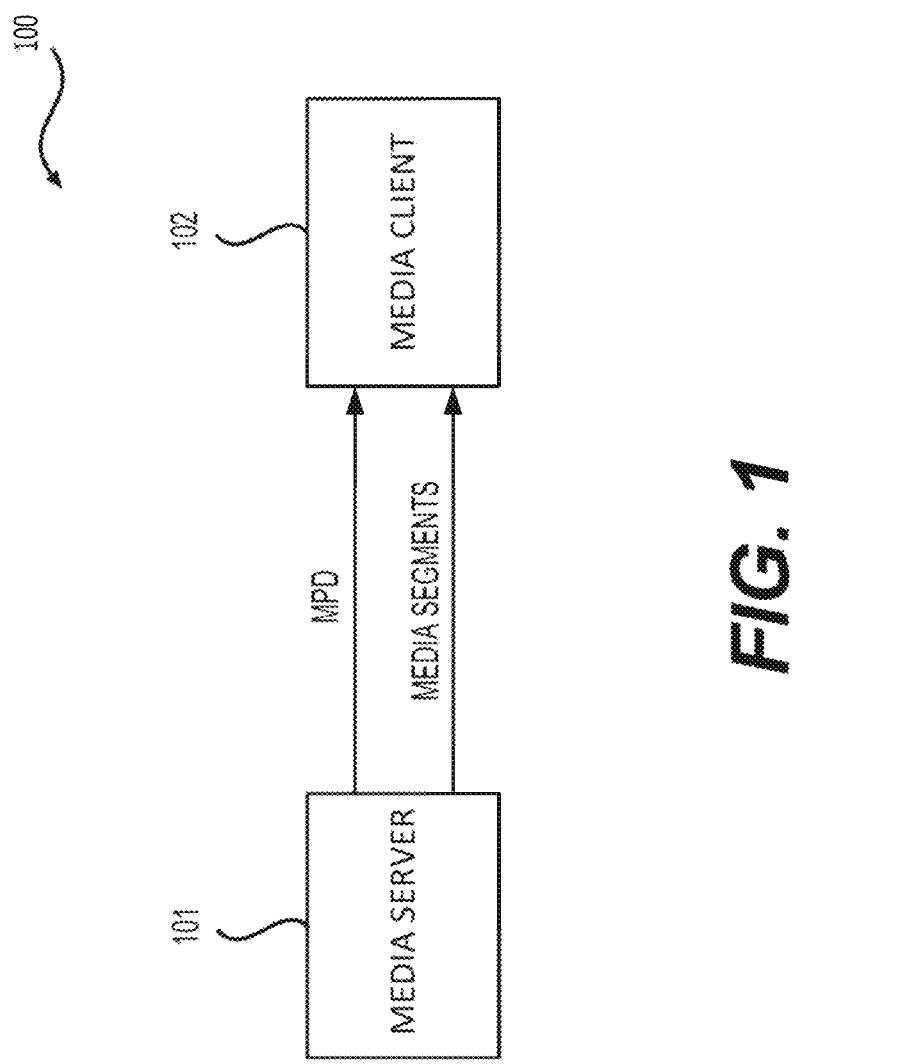
FIG. 1 shows a media system according to some embodiments of the disclosure.

Aspects of the disclosure provide techniques to use a single source buffer in a media player for playback multiple media contents, such as preroll content, live content and the like, and to handle switching from one media content to another media content.

According to some aspects of the disclosure, the media player is configured according to certain protocol and standard, such as common media application format standard, dynamic adaptive streaming over hypertext transfer protocol (DASH) and the like.

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any of the adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

In some examples (e.g., the International Organization for Standardization (ISO)/International Electrotechnical Commission (IEC) 23009-1 DASH standard), event message boxes are used for carrying events with media segments. In an example (e.g., ISO/IEC 23000-19 common media application format (CMAF)), the event message boxes are allowed to be included at the beginning of each CMAF chunk.

The event information can correspond to media timed events associated with points in time or periods of time in a media presentation (e.g., a continuous audio and/or video presentation). For example, the event information can be used for dynamic content replacement, ad insertion, presentation of supplemental content alongside audio and/or video, making changes to a web page, and executing application code triggered at specific points on a media timeline of the media presentation (e.g., an audio and/or video media stream).

The media timed events can be used to carry information intended to be synchronized with a media stream. For example, the event information can include metadata (or timed metadata) that describes content of the media presentation, such as program or chapter titles, or geolocation information. Further, the event information can include control messages for a media player that are associated with specific times during playback of the media presentation, such as advertisement insertion cues.

According to some aspects of the disclosure, DASH standard uses a single linear timeline, and the single linear timeline includes periods with contents (a period with content is referred to as a segment in some examples) that are the continuation of each other in a single timeline, and the playback of the media contents that are continuation of each other can be referred to as linear operation or linear playback. In some examples, the media to playback can include multiple parts that are independent of each other, the multiple parts can have respective timelines, and the playback of multiple parts that are independent of each other can be referred to as nonlinear operation or nonlinear playback.

In some examples, a media playing device (also referred to as media player, media client device in some examples) can be implemented using W3C Media Source Extensions (MSE) and use a media segment processing path for media playing. During operation, applications can send data segments into the media segment processing path for processing. For example, the data segments can be parsed and decoded by the media segment processing path and then be played by the media playing device. In some examples, the media segment processing path is implemented using a pipeline architecture, and is referred to as MSE pipeline. In some examples, the media segment processing path includes a single source buffer that is configured to buffer data segments according to W3C MSE, and the single source buffer can be referred to as a single MSE source buffer in some examples.

Some aspects of the disclosure provide techniques for using a single source buffer, such as a single MSE source buffer for nonlinear operation. The following description uses a preroll element (also referred to as preroll content) and a live program (also referred to as live content) as an example of two independent media sources to illustrate the techniques for using a single MSE source buffer for nonlinear operation. It is noted that the techniques can be used for other number of media sources and other types of media sources.

FIG. 1 shows a media system (100) according to some embodiments of the disclosure. In some examples, the media system (100) is implemented according to a DASH standard, and is referred to as DASH system. The media system (100) includes a media server (101)(e.g., content server) and a media client (102) that are suitably configured in communication, for example, via a network (not shown). In the media system (100), an MPD file is sent from the media server (101) to the media client (102). The media client (102) can receive media segments from the media server (101) based on the MPD file. The media client (102) can send a request to the media server (101) for updating the MPD file. The media server (101) can provide a content stream, including primary content (e.g., a main program) and one or more timed metadata tracks.

The media client (102) can be any suitable device configured with media processing capabilities. For example, the media client (102) can be desktop computer, laptop computer, tablet computer, smartphone, a head-mounted display, a media player, and the like. The media client (102) is also referred to as DASH client or DASH player in some examples.

Figure 2:
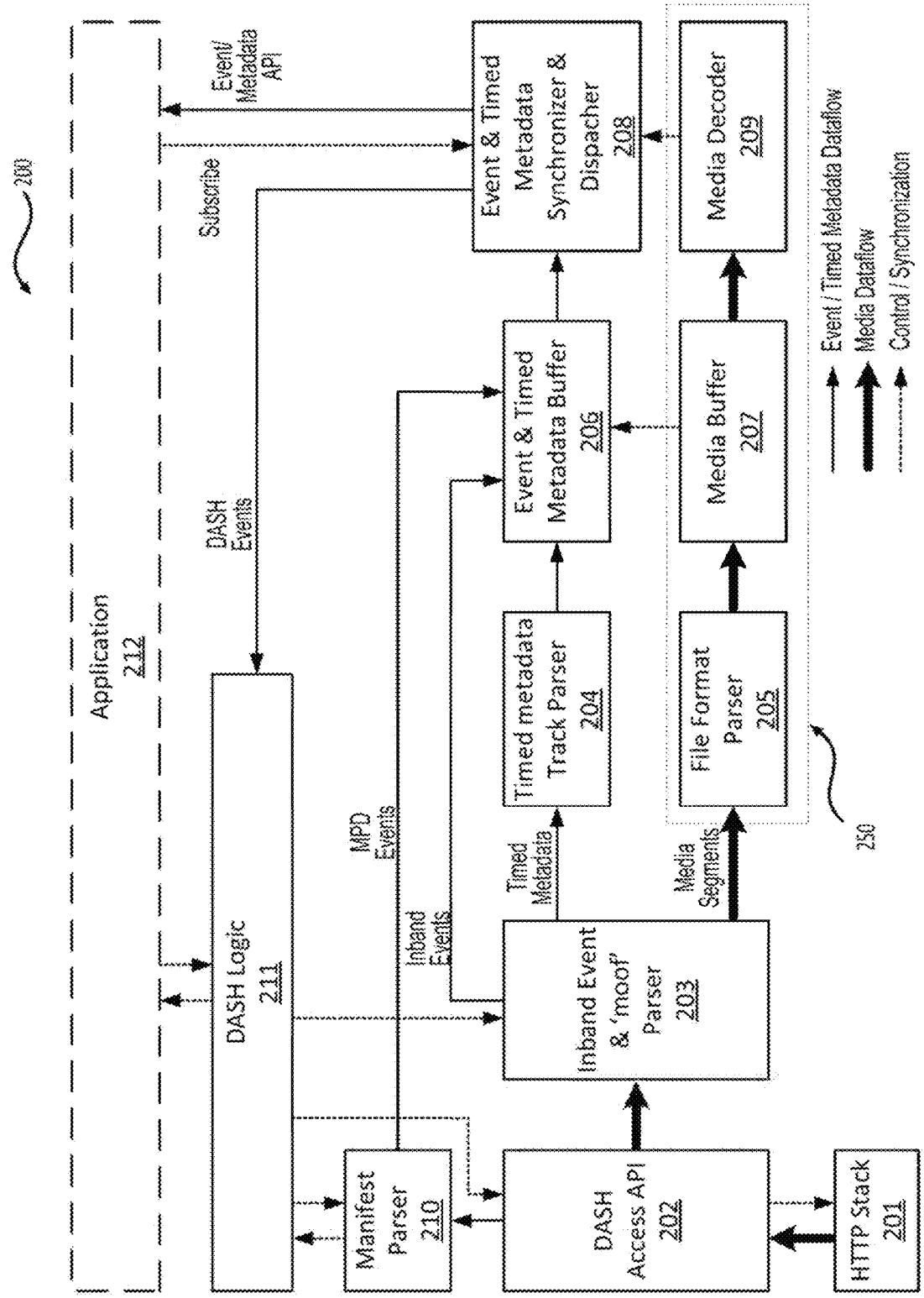
FIG. 2 shows a block diagram of a media client device according to some embodiments of the disclosure.

FIG. 2 shows a block diagram of a media client device (200) according to some embodiments of the disclosure. In some examples, the media client device (200) is used as the media client (102) in FIG. 1. The media client device (200) includes a media segment processing path (250) for media segment processing. In some examples, the media segment processing path (250) includes components that are configured in a pipeline architecture.

The media client device (200) can execute an application (212) that is a media ware application. The application (212) can cause the media client device (200) to process various types of events, including (i) MPD events, (ii) inband events, and (iii) timed metadata events.

In the FIG. 2 example, the media client device (200) includes a manifest parser (210) for parsing a manifest (e.g., an MPD). The manifest can be provided by the media server (101) for example. The manifest parser (210) can extract event information about MPD events, inband events, and timed metadata events embedded in timed metadata tracks. The extracted event information can be provided to a DASH logic (211) (e.g., DASH player control, selection, and heuristic logic). The DASH logic (211) can notify the application (212) of event schemes signaled in the manifest based on the event information.

The event information can include event scheme information for distinguishing between different event streams. The application (212) can use the event scheme information to subscribe to event schemes of interest. The application (212) can further indicate a desired dispatch mode for each of the subscribed schemes through one or more subscription application programming interfaces (APIs). For example, the application (212) can send a subscription request to the media server (101), and the request can identify one or more event schemes of interest and any desired corresponding dispatch modes.

In some examples, the application (212) can subscribe to one or more event schemes that are delivered as part of one or more timed metadata tracks, an inband event and 'moof' parser (203) can stream the one or more timed metadata tracks to a timed metadata track parser (204). For example, the inband event and 'moof' parser (203) parses a movie fragment box ("moof") and subsequently parses the timed metadata track based on control information from the DASH logic (211).

The timed metadata track parser (204) can extract event messages embedded in the timed metadata track. The extracted event messages can be stored in an event and timed metadata buffer (206). A synchronizer/dispatcher module (208) (e.g., event and timed metadata synchronizer and dispatcher) can dispatch (or send) the subscribed events to the application (212).

In some examples, MPD events described in the MPD can be parsed by the manifest parser (210) and stored in the event and timed metadata buffer (206). For example, the manifest parser (210) parses each event stream element of the MPD, and parses each event described in each event stream element. For each event signaled in the MPD, event information such as presentation time and event duration can be stored in the event and timed metadata buffer (206) in association with the event.

The inband event and 'moof' parser (203) can parse media segments to extract inband event messages. Any such identified inband events and associated presentation times and durations can be stored in the event and timed metadata buffer (206).

Accordingly, the event and timed metadata buffer (206) can store therein MPD events, inband events, and/or timed metadata events. The event and timed metadata buffer (206) can be a First-In-First-Out (FIFO) buffer, for example. The event and timed metadata buffer (206) can be managed in correspondence with a media buffer (207). For example, as long as a media segment exists in the media buffer (207), any events or timed metadata corresponding to that media segment can be stored in the event and timed metadata buffer (206).

A DASH Access API (202) can manage the fetching and reception of a content stream (or dataflow) including media content and various metadata through an HTTP protocol stack (201). The DASH Access API (202) can separate the received content stream into different dataflows. The dataflow provided to the inband event and 'moof' parser (203) can include media segments, one or more timed metadata tracks, and inband event signaling included in the media segments. In an embodiment, the dataflow provided to the manifest parser (210) can include an MPD.

The DASH Access API (202) can forward the manifest to the manifest parser (210). Beyond describing events, the manifest can also provide information on media segments to the DASH logic (211), which can communicate with the application (212) and the inband event and 'moof' parser (203). The application (212) can be associated with the media content processed by the DASH client. Control/synchronization signals exchanged among the application (212), the DASH logic (211), the manifest parser (210), and the DASH Access API (202) can control the fetching of media segments from the HTTP Stack (201) based on information regarding media segments provided in the manifest.

In some examples, the inband event and 'moof' parser (203) can parse a media dataflow into media segments including media content, timed metadata in a timed metadata track, and any signaled inband events in the media segments. In some examples, the inband event and 'moof' parser (203) can receive and parse media contents from multiple sources, such as a preroll content, a live content and the like, and extract media segments. The media segments of the multiple sources are provided to the media segment processing path (250) for further processing.

In the FIG. 2 example, the media segment processing path (250) includes multiple components that are coupled in a pipeline architecture for media segment processing. Specifically, in some examples, the media segment processing path (250) includes a file format parser (205), a media buffer (207) and a media decoder (209) that can be three processing stages for processing a media segment. The file format parser (205), the media buffer (207) and the media decoder (209) can operate on different media segments at the same time.

The file format parser (205) can receive a media segment and parse the media segment. The media buffer (207) can append the media segment in a suitable portion of a buffer space. The media decoder (209) can decode a media segment and send the decoded media content for play.

The events stored in the event and timed metadata buffer (206) can allow the synchronizer/dispatcher (208) to communicate to the application (212) the available events (or events of interest) related to the application (212) through an event/metadata API. The application (212) can be configured to process the available events (e.g., MPD events, inband events, or timed metadata events) and subscribe to particular events or timed metadata by notifying the synchronizer/dispatcher (208). Any events stored in the event and timed metadata buffer (206) that are not related to the application (212), but are instead related to the DASH client itself can be forwarded by the synchronizer/dispatcher (208) to the DASH logic (211) for further processing.

In response to the application (212) subscribing to particular events, the synchronizer/dispatcher (208) can communicate to the application (212) event instances (or timed metadata samples) corresponding to event schemes to which the application (212) has subscribed. The event instances can be communicated in accordance with a dispatch mode indicated by the subscription request (e.g., for a specific event scheme) or a default dispatch mode. For example, in an on-receive dispatch mode, event instances may be sent to the application (212) upon receipt in the event and timed metadata buffer (206). On the other hand, in an on-start dispatch mode, event instances may be sent to the application (212) at their associated presentation time, for example in synchronization with timing signals from the media decoder (209).

It is noted that, in the FIG. 2 example, the thick dataflow lines indicate media dataflow, the narrow dataflow lines indicate even and timed metadata dataflow, and the dash dataflow lines indicates control and synchronization. In addition, the same processing model can be used for CMAF events.

Some aspects of the disclosure provide a timing model for a media player, such as the media client device (200), to handle media segments in a MSE source buffer. In some examples, the single MSE source buffer is used for buffering media segments of multiple media contents, such as a preroll content and a live content. Further, the single MSE source buffer with the buffered media segments are used for playback of the preroll content and the live content.

According to an aspect of the disclosure, the MSE source buffer is configured to include a time shift buffer that provides time shifting features. In some examples, the time shift buffer is configured to correspond to a time span on the MPD timeline that defines the set of media segments that is allowed to present at the current moment in time according to a wall clock. The wall clock is used as a timing reference for media client decisions in some examples. In an example, the wall clock is a synchronized clock shared by the media client and media server.

According to an aspect of the disclosure, an MPD can define an ordered list of one or more consecutive non-overlapping periods. A period is both a time span on the MPD timeline and a definition of the data to be presented during this time span. Period timing can be represented relative to the zero point of the MPD timeline, and can be represented indirectly as being relative to the previous period. For example, a start of a period can be specified explicitly as an offset from the MPD timeline zero point or can be represented implicitly by the end of the previous period. The duration of a period can be specified either explicitly or can be implicitly specified based on the end of the previous period and the start of a next period.

In some examples, periods in the MPD timeline are self-contained, thus a media client device can present media content of a period without knowing the contents of another period. However, knowledge of the contents of different periods may be used by a media client device to achieve period transitions.

In some examples, a media client device can present using two types of presentations that are respectively referred to as a static presentation and a dynamic presentation. In the static presentation, any media segment may be presented at any time. The media client device can control over what content is presented when and the entire presentation is available at any time, such as in the case of preroll content. In the dynamic presentation, the MPD timeline is mapped to wall clock time, with each media segment on the MPD timeline intended to be presented at a specific moment in time (with some media client device chosen time shift allowed).

In some examples, in a dynamic presentation, the zero point of the MPD timeline is the mapped to the point in wall clock time indicated by the effective availability start time. Thus, each media segment is associated with a wall clock time that indicates the moment the media segment is intended to be presented.

According to an aspect of the disclosure, a time shift is defined as an offset between the wall clock time and the MPD timeline when presenting dynamic presentations. In some examples, the time shift is zero when a media client device is presenting the media segment at the end point of the time shift buffer. By playing back media segments from further in the past, a positive time shift is introduced. In an example, a time shift of 30 seconds means that the media client device starts presenting a media segment at the moment when its position on the MPD timeline reaches a distance of 30 seconds from the end of the time shift buffer. In some example, a parameter that is referred to as a time shift buffer depth is defined as a time range from a start of the time shift buffer to the wall clock (now). The MSE source buffer is configured to support a required time shift buffer depth.

In an example, the preroll content and the live content can have a single master initialization segment, the MSE source buffer is configured to be possible to transition from preroll content to the live content without re-initialization.

In some examples, the preroll content and the live content can have different initialization segments. For example, the preroll content and the live content have different codec or different profile or different level, thus may need different initialization segments. The MSE source buffer is configured to be possible to play the media contents with added re-initialization segments.

In some examples, the MSE source buffer is configured to maintain the preroll content in the time shift buffer, so that media player can seek back to preroll content. In some examples, the MSE source buffer is configured to replace the preroll content with the live content so that the player can seek to the live content in the time shift buffer.

In the following description, preroll content and live content are used to illustrate the techniques used in the MSE source buffer.

The preroll content refers to on-demand content that all media segments are available before playback. In some examples, the exact duration of the preroll content is unknown, but the maximum possible duration (denoted $D_{MAX}$) is known. The presentation time offset for the preroll content is known and denoted by $PTO_P$ with timescale $T_P$.

For the live content, the availability start time of live content and the current period start time are known. The period start time in wall clock time can be denoted by $PStart_L$. The presentation time offset is known and denoted by $PTO_L$ with timescale $T_L$. The segment address for starting the live program is known but the exact earliest presentation time (denoted by $EPT_L$) of that segment is not known. However, a lower-bound value for the $EPT_L$ is known and denoted by $EPT_{min}$. The desired time shift buffer depth for the live content is known as $TSBD_L$.

Figure 3:
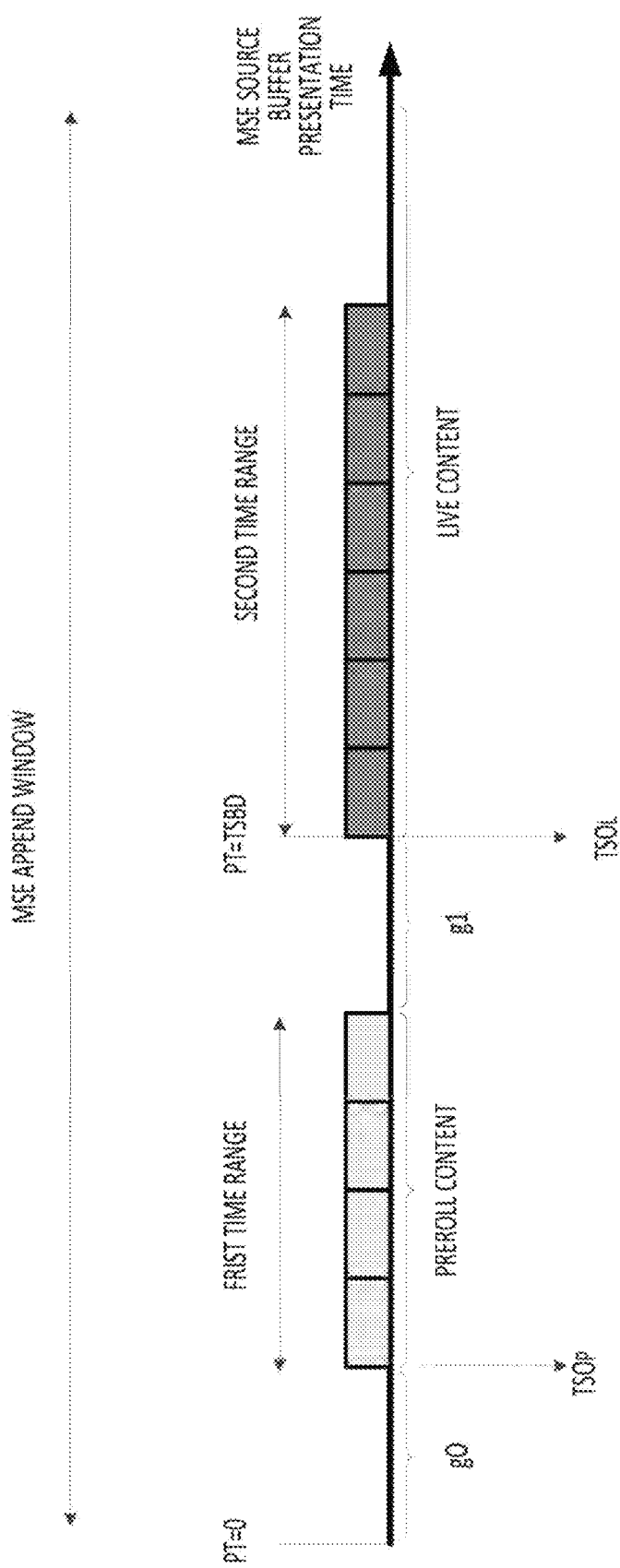
FIG. 3 shows a timing model for a source buffer in some examples.

FIG. 3 shows a timing model for a MSE source buffer in some examples.

In some embodiments, an append window is defined that can, in minimum, include the preroll content and a time shift buffer depth. Generally, an append window is a presentation timestamp range that is used to filter out coded frames while appending. The append window represents a single continuous time range with a single start time and end time. Coded frames with presentation timestamp within the MSE append window are allowed to be appended to the MSE source buffer while coded frames outside this range are filtered out.

In some embodiments, the timeline of the MSE source buffer is separate into time ranges for media contents. In the FIG. 3 example, the MSE source buffer timeline includes a first time range for preroll content (e.g., preroll segments) and a second time range for live content (e.g., live segments). The first time range is denoted by (Pstart, Pend) and the second time range is denoted by (Lstart, Lend). Pstart is the start time of the preroll content, Pend is the end time of the preroll content, Lstart is the start time of the live content, and Lend is the end time of the live content.

In some examples, timestamp offset (TSO) is a parameter that is used to control offset applied to timestamps inside subsequent media segments that are appended to the MSE source buffer. TSO being 0 indicates that no offset is applied. In the FIG. 3 example, the presentation start time is assumed to be 0 (e.g., PT=0). The MSE source buffer allows a play back position of the preroll content is after the presentation start time and before the first time range. A timing gap g0 is from the first segment of the preroll content to the presentation start time; and a timing gap g1 is between the last segment for the preroll content and the first segment of the live content. In an example, a timestamp offset $TSO_P$ can be determined for applying to timestamps in the preroll segments, and a timestamp offset $TSO_L$ can be determined for applying to timestamps in the live segments.

In some examples, when the last media segment of the preroll content in the first time range is played, the media client device can seek to the start of the second time range.

In some examples, if the preroll content is expected to be played once, the first time range can be purged after the preroll content is played. In some examples, if the media client device seeks to earlier time shifted live content, a third time range for earlier time shifted live content can be created before the first time range if the preroll content is expected to be played.

Figure 4:
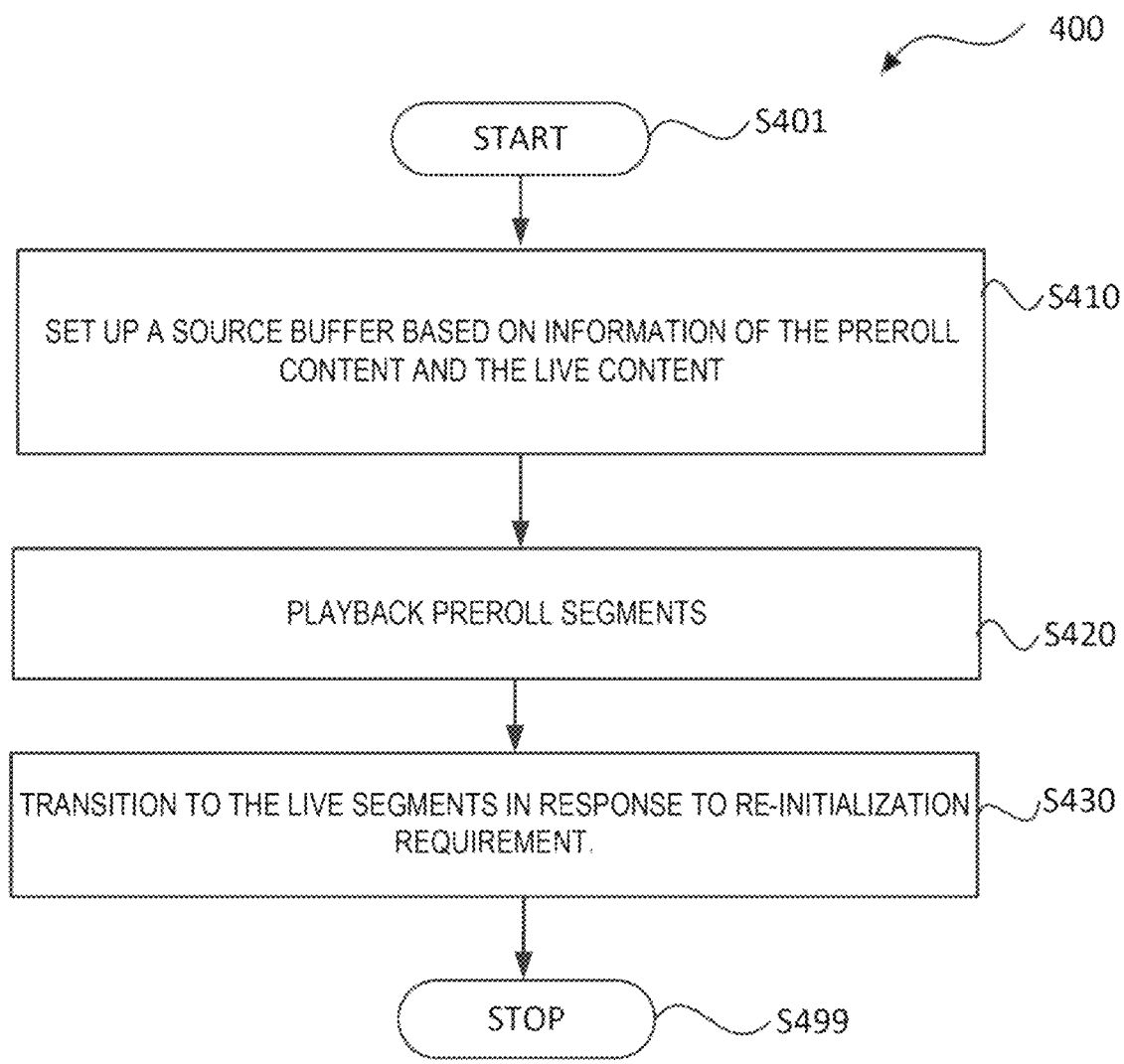
FIG. 4 shows a flow chart outlining a process for using a source buffer in a media client device for nonlinear operation according to some embodiments of the disclosure.

FIG. 4 shows a flow chart outlining a process (400) for using a source buffer in a media client device, such as an MSE source buffer in the media client device (200), for nonlinear operation according to some embodiments of the disclosure.

At (S410), a source buffer is setup based on information of the preroll content and the live content. In some examples, the preroll content is played once and then can be removed from the source buffer. In some examples, after the preroll content is played once, the preroll content stays in the source buffer as midroll. The source buffer can be suitably setup in different examples. The source buffer setup will be described in detail with reference to two specific cases.

At (S420), the playback of the preroll segments is performed. The playout will be described in detail with reference to the two specific cases.

At (S430), a transition to the live segments can be performed in response to a re-initialization requirement. In some examples, live content has the same profile and level as the preroll content, thus the playback of the live content can be performed using a same master initialization segment for both the preroll segments and the live segments. In some examples, the live content uses different codec from the preroll content, or the live content has a different profile (profile can be used define specific restrictions, for example, on media content type, media format, codec, protection format, bitrate, segment duration, size, and the like) from the preroll content, or the live content has a different level (e.g., adaptation set, representation, or preselection) from the preroll content, then a re-initialization is needed for the playback of the live segments. The transition will be described in detail with reference to the two specific cases.

In a first case, the preroll content is played once and then can be removed from the source buffer.

To set up the source buffer, in some examples, after the media client device checks that the media source supports the preroll video codec and profile, the media client device can create a source buffer. The media client device then sets up an append window of the source buffer. In an example, a maximum time shift (denoted by $TSB_{Max}$) is determined as a larger one of the maximum duration of the preroll content (denoted by $D_{MAX}$) and the desired time shift buffer depth for the live content ($TSBD_L$), for example using Eq. (1):

$$TSB_{Max} = \max(D_{MAX}, TSBD_L) \qquad \text{Eq. (1)}$$

Further, a parameter $L_{Max}$ is used to indicate the longest duration for the live content. In some examples, the longest duration for the live content (e.g., a live program) is known, then the parameter $L_{Max}$ can be determined accordingly. Then, the start of the append window is set to 0, and the end of the append window is set to a sum of the $TSB_{Max}$ and $L_{Max}$. In some examples, the duration of the live program is not known, the end of the append window can be a large number or infinity.

To perform the playback of the preroll content, in some examples, the media client device sets the $TSO_P$ for preroll segments according to Eq. (2):

$$TSO_P = TSB_{Max} - D_{MAX} - \left(\frac{PTO_P}{T_P}\right) \qquad \text{Eq. (2)}$$

Then, the media client device fetches the first preroll segment and appends the first preroll segment to the source buffer. Further, the media client device continues fetching the rest of the preroll segments to the last preroll segment, and appends the fetched preroll segments into the source buffer in a continuous order. After appending the last preroll segment, the media client device transitions to the live segments in response to re-initialization requirement.

In some examples, the live content has the same profile and level as the preroll content, thus a same initialization segment (referred to as master initialization segment in some examples) can be used for both the live content and the preroll content, and no re-initialization is needed. To transition to the live segments, the media client device sets the $TSO_L$ for live segments according to Eq. (3):

$$TSO_L = TSB_{Max} - EPT_{min} - \left(\frac{PTO_L}{T_L}\right) \qquad \text{Eq. (3)}$$

Then, the media client device fetches the first live segment and appends the first live content to the source buffer. The media client device continues fetching the live segments, and appends the fetched live segments into the source buffer in a continuous order.

When the last segment of the preroll content is decoded and played, the media client device can seek to the starting time of the live content time range to decode and play the first segment of the live content.

In some examples, the live content has the same profile and level as the preroll content, thus a same initialization segment (referred to as master initialization segment in some examples) can be used for both the live content and the preroll content, and no re-initialization is needed. However, in an example, the source buffer can be set to a sequence mode that allows a media segment to be placed immediate after previous media segment.

To transition to the live segments, in the sequence mode, the media client device can fetch the first live segment and append the first live segment to the source buffer with the sequence mode, for example adjacent after the last segment of the preroll content. In an example, the $TSO_L$ can be set according to Eq. (4):

$$TSO_L = TSB_{Max} - EPT_L - \left(\frac{PTO_L}{T_L}\right) \qquad \text{Eq. (4)}$$

The earliest presentation time $EPT_L$ for the live content can be determined based on the buffered preroll segments. It is noted that, in an example, the live segment is added to the first time range for the preroll content. Then, the media client device can continue fetching the live segments and append the fetched live segments into the source buffer.

In some examples, the live content has a different codec or different profile (e.g., higher profile) or different level (e.g., higher level) than the preroll content, and then the live content has a different master initialization segment from the preroll content, and re-initialization is needed.

To transition to the live segments, the media client device can update the $TSO_L$ according to Eq. (4). Then, a re-initialization can be performed. In an example, a method changeType( ) can be issued with the codec/profile/level for the live content. The media client device can generate a new time range for the live segments. Then, the media client device can start fetching the live segments and append the live segments into the source buffer. While playing, when the end of the preroll time range is reached, the media client device can seek to the start time of the live content time range.

In the first case, the media client device can perform time shift buffering management. The time shift buffering can include two ranges: a first time range (Pstart, Pend), and a second time range (Lstart, Lend). In a general case, the timing gap g0 is from the presentation start time to the first segment of the preroll content (e.g., g0=(0,Pstart)); and the timing gap g1 is between the last segment for the preroll content and the first segment of the live content (e.g., g1=(Pend,Lstart)). In an example, if $TSB_{MAX}=D_{MAX}$, then g0=0. In another example, if duration of the preroll content $Dp=D_{MAX}$ and $EPT_{min}=EPT_L$, then g1=0.

In some examples, the media client device removes the preroll content from the time shift buffer after the playing of the preroll content. To remove the preroll content from the time shift buffering, the media client device can first remove time range (Pstart, Pend). Thus, the source buffer would be empty in (0, $TSB_{MAX}$). Then, the media client device can change the start of the append window from 0 to $TSB_{MAX}-TSBD_L$. Thus, the time shift buffer depth would be $TSBD_L$ and if the media client device seeks to the time shift buffer, the appropriate segments would be fetched.

In a second case, the preroll content is played once and stays in the source buffer as midroll.

To set up the source buffer, in some examples, after the media client device checks that the media source supports the preroll video codec and profile, the media client device can create a source buffer. The media client device then sets up an append window of the source buffer. In an example, a maximum time shift (denoted by $TSB_{Max}$) is determined based on the maximum duration of the preroll content (denoted by $D_{MAX}$), the desired time shift buffer depth for the live content ($TSBD_L$), $EDP_L$ and $EDP_{min}$, for example using Eq. (5):

$$TSB_{Max} = D_{MAX} + TSBD_L + \text{upperbound}(EDP_L - EDP_{min}) \quad \text{Eq. (5)}$$

Further, a parameter $L_{Max}$ is used to indicate the longest duration for the live content. In some examples, the longest duration for the live content (e.g., a live program) is known, then the parameter $L_{Max}$ can be set accordingly. Then, the start of the append window is set to 0, and the end of the append window is set to a sum of the $TSB_{Max}$ and $L_{Max}$. In some examples, the duration of the live content is not known, then the end of the append window can be a large number or infinity.

To perform the playback of the preroll content, in some examples, the media client device sets the $TSO_P$ for preroll segments according to Eq. (6):

$$TSO_P = TSB_{Max} - D_{MAX} - \left(\frac{PTO_P}{T_P}\right) \quad \text{Eq. (6)}$$

Then, the media client device fetches the first preroll segment and appends the first preroll segment to the source buffer. Further, the media client device continues fetching the rest of the preroll segments to the last preroll segment, and appends the fetched preroll segments into the source buffer in a continuous order. After appending the last preroll segment, the media client device transitions to the live segments in response to re-initialization requirement.

In some examples, the live content has the same profile and level as the preroll content, thus a same initialization segment (referred to as master initialization segment in some examples) can be used for both the live content and the preroll content, and no re-initialization is needed. To transition to the live segments, the media client device sets the $TSO_L$ for live segments according to Eq. (7):

$$TSO_L = TSB_{Max} - EPT_{min} - \left(\frac{PTO_L}{T_L}\right) \quad \text{Eq. (7)}$$

Then, the media client device fetches the first live segment and appends the first live content to the source buffer. The media client device continues fetching the live segments, and appends the fetched live segments into the source buffer in a continuous order.

When the last segment of the preroll content is decoded and played, the media client device can seek to the starting time of the live content time range to decode and play the first segment of the live content.

In some examples, the live content has the same profile and level as the preroll content, thus a same initialization segment (referred to as master initialization segment in some examples) can be used for both the live content and the preroll content, and no re-initialization is needed. However, in an example, the source buffer can be set to a sequence mode that allows a media segment to be placed immediate after previous media segment.

To transition to the live segments, in the sequence mode, the media client device can fetch the first live segment and append the first live segment to the source buffer with the sequence mode, for example adjacent after the last segment of the preroll content. In an example, the $TSO_L$ can be set according to Eq. (8):

$$TSO_L = TSB_{Max} - EPT_L - \left(\frac{PTO_L}{T_L}\right) \quad \text{Eq. (8)}$$

The earliest presentation time $EPT_L$ for the live content can be determined based on the buffered preroll segments. It is noted that, in an example, the live segment is added to the first time range for the preroll content. Then, the media client device can continue fetching the live segments and append the fetched live segments into the source buffer.

In some examples, the live content has a different codec or different profile (e.g., higher profile) or different level (e.g., higher level) than the preroll content, and then the live content has a different master initialization segment from the preroll content, and re-initialization is needed.

To transition to the live segments, the media client device can update the $TSO_L$ according to Eq. (4). Then, a re-initialization can be performed. In an example, a method changeType( ) can be issued with the codec/profile/level for the live content. The media client device can generate a new time range for the live segments. Then, the media client device can start fetching the live segments and append the live segments into the source buffer. While playing, when the end of the preroll time range is reached, the media client device can seek to the start time of the live content time range.

In the second case, the media client device can perform time shift buffering management. The time shift buffering can include two ranges: a first time range (Pstart, Pend), and a second time range (Lstart, Lend). In a general case, the timing gap g0 is from the presentation start time to the first segment of the preroll content (e.g., g0=(0,Pstart)); and the timing gap g1 is between the last segment for the preroll content and the first segment of the live content (e.g., g1=(Pend,Lstart)). In an example, if duration of the preroll content $Dp=D_{MAX}$ and $EPT_{min}=EPT_L$, then g1=0.

In the second case, the preroll content stays in the source buffer after being played, and the media client device can configure a third time range for time shift buffering of a portion of the live content before the preroll content. In some examples, to fill the portion of the live content before the preroll content in the source buffer for the time shift buffering, the media client device determines a timestamp offset $TSO_{LBP}$ for the portion of the live content before the preroll content, for example, according to Eq. (9):

$$TSO_{LBP} = EPT_{min} - MSD - TSB_L - \left(\frac{PTO_L}{T_L}\right) \quad \text{Eq. (9)}$$

where MSD denotes a maximum segment duration in the live content.

Then, the media client device can fetch segments of the live content that are in the range of (EPTmin−$TSBD_L$) to the EPTmin and append the fetched segments to the source buffer. The media client device can continue appending segments until a segment before EPTmin.

According to an aspect of the disclosure, the above described techniques can be used for MPD chaining. MPD chaining refers to a mechanism to indicate that, at the end of one media presentation, a new media presentation starts. In some examples, a first media presentation is played until the end, and once the first media presentation is finished, a new chained media presentation (also referred to as a second media presentation) is played instantaneously. A media client device receives the chained-from MPD (the first media presentation) is configured to play the chained-to MPD (the second media presentation) right after the chained-from one (the first media presentation). Each MPD has its own independent media timeline, but the media client device can continue the presentation to create a sequential presentation. The chained-from MPD may be of type static or dynamic. The chained-to MPD may also be of type static and type dynamic.

In some examples, the first media presentation is an on-demand MPD that is played as the preroll content and then is chained to second media presentation that is a live MPD. In some examples, using the above described techniques, the source buffer can be configured to include a preroll time range and a live content time range. The preroll time range is used to buffer the content described by on-demand MPD and the live content time range is used for the live MPD. The above described techniques for handing preroll content and live content, such as the timing model, configuration of the source buffer, the management of time shift buffering, and seeking between time ranges can be equivalently applied to on-demand MPD and the live MPD.

The techniques described above, can be implemented as computer software using computer-readable instructions and physically stored in one or more computer-readable media. For example, FIG. 5 shows a computer system (500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
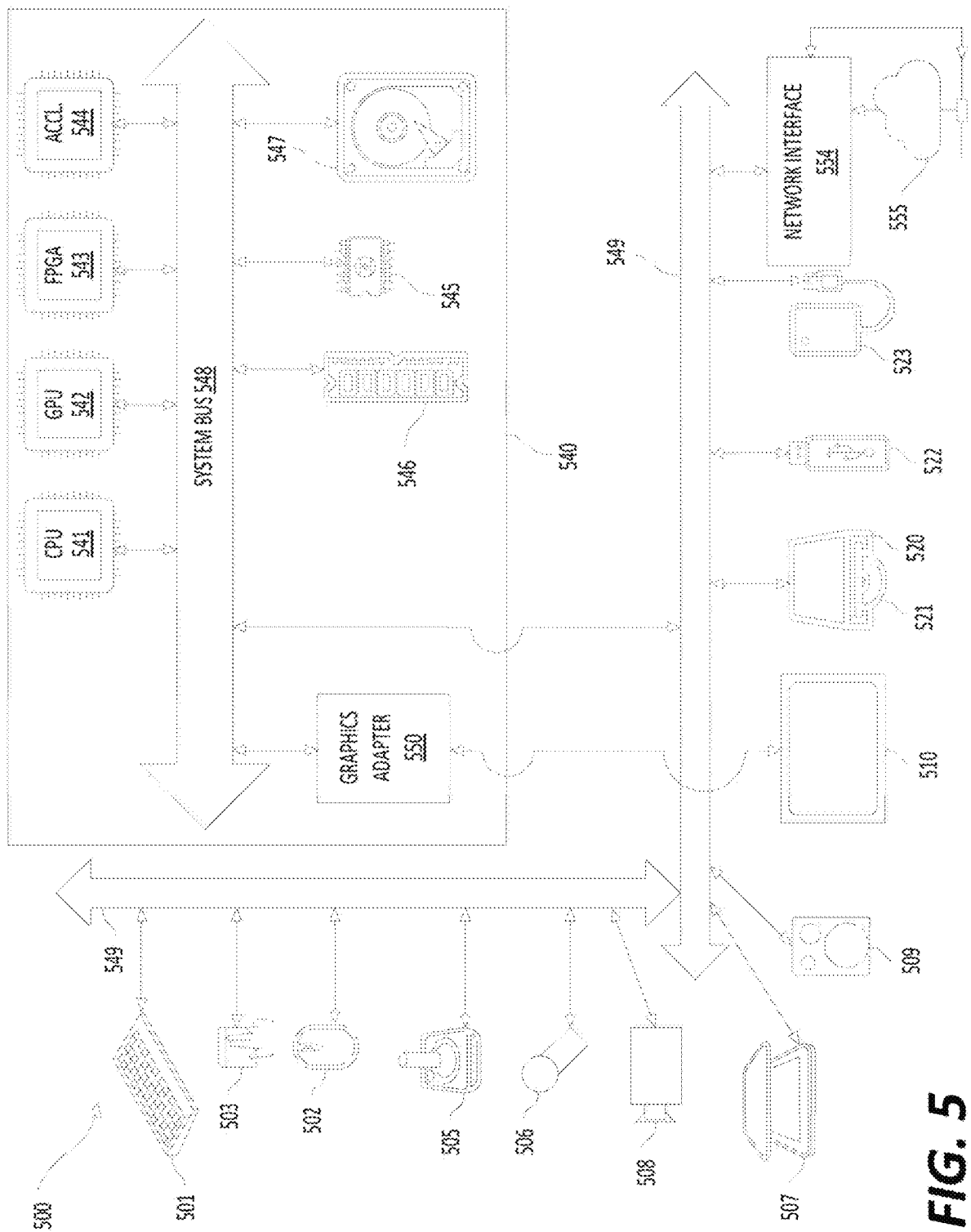
FIG. 5 shows a schematic illustration of a computer system in accordance with an embodiment.

The components shown in FIG. 5 for computer system (500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (500).

Computer system (500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (501), mouse (502), trackpad (503), touch screen (510), data-glove (not shown), joystick (505), microphone (506), scanner (507), camera (508).

Computer system (500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (510), data-glove (not shown), or joystick (505), but there can also be tactile feedback devices that do not serve as input devices), audio output devices (such as: speakers (509), headphones (not depicted)), visual output devices (such as screens (510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (500) can also include human accessible storage devices and their associated media such as optical media including CD/DVD ROM/RW (520) with CD/DVD or the like media (521), thumb-drive (522), removable hard drive or solid state drive (523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (500) can also include an interface (554) to one or more communication networks (555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (549) (such as, for example USB ports of the computer system (500)); others are commonly integrated into the core of the computer system (500) by attachment to a system bus as described below (for example Ethernet interface into a PC computer system or cellular network interface into a smartphone computer system). Using any of these networks, computer system (500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (540) of the computer system (500).

The core (540) can include one or more Central Processing Units (CPU) (541), Graphics Processing Units (GPU) (542), specialized programmable processing units in the form of Field Programmable Gate Areas (FPGA) (543), hardware accelerators for certain tasks (544), graphics adapters (550), and so forth. These devices, along with Read-only memory (ROM) (545), Random-access memory (546), internal mass storage such as internal non-user accessible hard drives, SSDs, and the like (547), may be connected through a system bus (548). In some computer systems, the system bus (548) can be accessible in the form of one or more physical plugs to enable extensions by additional CPUs, GPU, and the like. The peripheral devices can be attached either directly to the core's system bus (548), or through a peripheral bus (549). In an example, the screen (510) can be connected to the graphics adapter (550). Architectures for a peripheral bus include PCI, USB, and the like.

CPUs (541), GPUs (542), FPGAs (543), and accelerators (544) can execute certain instructions that, in combination, can make up the aforementioned computer code. That computer code can be stored in ROM (545) or RAM (546). Transitional data can be also stored in RAM (546), whereas permanent data can be stored for example, in the internal mass storage (547). Fast storage and retrieve to any of the memory devices can be enabled through the use of cache memory, that can be closely associated with one or more CPU (541), GPU (542), mass storage (547), ROM (545), RAM (546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (500), and specifically the core (540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (540) that are of non-transitory nature, such as core-internal mass storage (547) or ROM (545). The software implementing various embodiments of the present disclosure can be stored in such devices and executed by core (540). A computer-readable medium can include one or more memory devices or chips, according to particular needs. The software can cause the core (540) and specifically the processors therein (including CPU, GPU, FPGA, and the like) to execute particular processes or particular parts of particular processes described herein, including defining data structures stored in RAM (546) and modifying such data structures according to the processes defined by the software. In addition or as an alternative, the computer system can provide functionality as a result of logic hardwired or otherwise embodied in a circuit (for example: accelerator (544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for media playing via a dynamic adaptive streaming over hypertext transfer protocol (DASH) player, the method comprising:
    configuring a media source extension (MSE) source buffer based on a first media content and a second media content that are of independent reference timelines, the first media content being preroll content;
    determining a first timestamp offset (TSO) that is applied to timestamps of segments of the first media content appended in the MSE source buffer according to first $TSO = TSB_{Max} - D_{Max} - (PTO_P / T_P)$ wherein $TSB_{Max}$ is a maximum time shift buffer depth, $D_{Max}$ is a maximum possible duration of the first media content, $PTO_P$ is a presentation time offset of the first media content, and $T_P$ is a timescale of the first media content;
    playing the segments of the first media content that are appended in the MSE source buffer based on the first timestamp offset; and
    transitioning, after a last segment of the first media content, to a first segment of segments of the second media content that are appended in the MSE source buffer,
    wherein the first timestamp offset is applied to the timestamps of the segments of the first media content appended in the MSE source buffer and a second timestamp offset is applied to timestamps of the segments of the second media content appended in the MSE source buffer.

2. The method of claim 1, further comprising:
    configuring an append window in the MSE source buffer based on the first media content and the second media content.

3. The method of claim 2, wherein the second media content is a live content, and the method further comprises:
    determining an end point of the append window as a sum of the maximum time shift buffer depth and a longest duration of the live content.

4. The method of claim 3, further comprising:
    determining the maximum time shift buffer depth as a larger one of the maximum possible duration of the preroll content and a desired time shift buffer depth for the live content.

5. The method of claim 4, further comprising:
    removing a time range of the preroll content after the preroll content is played; and
    updating a start of the append window based on the maximum time shift buffer depth and the desired time shift buffer depth for the live content.

6. The method of claim 4, further comprising:
    determining the maximum time shift buffer depth based on a sum of at least the maximum possible duration of the preroll content, and the desired time shift buffer depth for the live content.

7. The method of claim 6, further comprising:
    configuring a time range in the MSE source buffer for a portion of the live content before the preroll content.

8. The method of claim 1, wherein
    the second media content is a live content, and the MSE source buffer includes a file format parser, a media buffer, and a media decoder.

9. The method of claim 8, further comprising:
determining the second timestamp offset for the segments of the live content based on the maximum time shift buffer depth and an earliest presentation time of the first segment of the live content.

10. The method of claim 9, further comprising at least one of:
determining the second timestamp offset for the segments of the live content based on the maximum time shift buffer depth and a lower bound of the earliest presentation time of the first segment of the live content in response to a same initialization segment for the live content and the preroll content;
determining the second timestamp offset for the segments of the live content based on the maximum time shift buffer depth and the earliest presentation time of the first segment of the live content in response to a sequence mode; and
determining the second timestamp offset for the segments of the live content based on the maximum time shift buffer depth and the earliest presentation time of the first segment of the live content in response to a requirement of re-initialization for the live content.

11. An apparatus for media playing via a dynamic adaptive streaming over hypertext transfer protocol (DASH) player, comprising processing circuitry configured to:
configure a media source extension (MSE) source buffer based on a first media content and a second media content that are of independent reference timelines, the first media content being preroll content;
determine a first timestamp offset (TSO) that is applied to timestamps of segments of the first media content appended in the MSE source buffer according to first $TSO = TSB_{Max} - D_{Max} - (PTO_P/T_P)$, wherein $TSB_{Max}$ is a maximum time shift buffer depth, $D_{Max}$ is a maximum possible duration of the first media content, $PTO_P$ is a presentation time offset of the first media content, and $T_P$ is a timescale of the first media content;
play segments of the first media content that are appended in the MSE source buffer based on the first timestamp offset; and
transition after a last segment of the first media content, to a first segment of segments of the second media content that are appended in the MSE source buffer, wherein the first timestamp offset is applied to the timestamps of the segments of the first media content appended in the MSE source buffer and a second timestamp offset is applied to timestamps of the segments of the second media content appended in the MSE source buffer.

12. The apparatus of claim 11, wherein the processing circuitry is further configured to:
configure an append window in the MSE source buffer based on the first media content and the second media content.

13. The apparatus of claim 12, wherein the second media content is a live content, and the processing circuitry is further configured to:
determine an end point of the append window as a sum of the maximum time shift buffer depth and a longest duration of the live content.

14. The apparatus of claim 13, wherein the processing circuitry is further configured to:
determine the maximum time shift buffer depth as a larger one of the maximum possible duration of the preroll content and a desired time shift buffer depth for the live content.

15. The apparatus of claim 14, wherein the processing circuitry is further configured to:
remove a time range of the preroll content after the preroll content is played; and
update a start of the append window based on the maximum time shift buffer depth and the desired time shift buffer depth for the live content.

16. The apparatus of claim 14, wherein the processing circuitry is further configured to:
determine the maximum time shift buffer depth based on a sum of at least the maximum possible duration of the preroll content, and the desired time shift buffer depth for the live content.

17. The apparatus of claim 16, wherein the processing circuitry is further configured to:
configure a time range in the MSE source buffer for a portion of the live content before the preroll content.

18. The apparatus of claim 11, wherein
the second media content is a live content, and
the MSE source buffer includes a file format parser, a media buffer, and a media decoder.

19. The apparatus of claim 18, wherein the processing circuitry is further configured to:
determine the second timestamp offset for the segments of the live content based on the maximum time shift buffer depth and an earliest presentation time of a first segment of the live content.

20. The apparatus of claim 19, wherein the processing circuitry is further configured to perform at least one of:
determining the second timestamp offset for the segments of the live content based on the maximum time shift buffer depth and a lower bound of the earliest presentation time of the first segment of the live content in response to a same initialization segment for the live content and the pre roll content;
determining the second timestamp offset for the segments of the live content based on the maximum time shift buffer depth and the earliest presentation time of the first segment of the live content in response to a sequence mode; and
determining the second timestamp offset for the segments of the live content based on the maximum time shift buffer depth and the earliest presentation time of the first segment of the live content in response to a requirement of re-initialization for the live content.

* * * * *